United States Patent

Helft et al.

(10) Patent No.: US 7,740,938 B2
(45) Date of Patent: Jun. 22, 2010

(54) PRODUCTION OF SPHERICAL POLYAMIDE PARTICLES

(75) Inventors: Matthieu Helft, Lyons (FR); Eric Roche, Luzinay (FR)

(73) Assignee: Rhodia Polyamide Intermediates, Saint Fons (FR)

( * ) Notice: Subject to any disclaimer, the term of this patent is extended or adjusted under 35 U.S.C. 154(b) by 0 days.

(21) Appl. No.: 10/562,051

(22) PCT Filed: Jun. 22, 2004

(86) PCT No.: PCT/FR2004/001555

§ 371 (c)(1),
(2), (4) Date: Jul. 30, 2007

(87) PCT Pub. No.: WO2005/000456

PCT Pub. Date: Jan. 6, 2005

(65) Prior Publication Data

US 2007/0269656 A1 Nov. 22, 2007

(30) Foreign Application Priority Data

Jun. 26, 2003 (FR) .................................. 03 07719

(51) Int. Cl.
*C08G 69/26* (2006.01)

(52) U.S. Cl. ........................ 428/402; 528/310; 528/312; 528/332

(58) Field of Classification Search ................. 528/312, 528/310, 332; 260/78; 428/402
See application file for complete search history.

(56) References Cited

U.S. PATENT DOCUMENTS

| 3,446,782 | A | * | 5/1969 | Nakasatomi et al. | ........ 528/323 |
| 4,069,184 | A | | 1/1978 | Ferraro et al. | |
| 4,102,846 | A | * | 7/1978 | Bentley et al. | ............... 524/533 |
| 4,254,207 | A | * | 3/1981 | Landoll et al. | ......... 430/137.19 |
| 5,135,991 | A | | 8/1992 | Suzuki | |
| 5,244,984 | A | | 9/1993 | Suzuki | |
| 6,127,513 | A | * | 10/2000 | Ohara et al. | ................ 528/320 |
| 6,326,460 | B1 | | 12/2001 | Mohrschladt et al. | |
| 2003/0059473 | A1 | * | 3/2003 | Montasser et al. | .......... 424/490 |

FOREIGN PATENT DOCUMENTS

| EP | 0866088 B1 | | 9/1998 |
| FR | 2642079 A1 | | 7/1990 |
| WO | WO 99/43407 A1 | | 9/1999 |
| WO | WO01/68235 | * | 9/2001 |

OTHER PUBLICATIONS

International Search Report Corresponding to PCT/FR 2004/001555 Issued on Jan. 21, 2005, 4 Pages.

* cited by examiner

*Primary Examiner*—James Seidleck
*Assistant Examiner*—Gregory Listvoyb
(74) *Attorney, Agent, or Firm*—Buchanan Ingersoll & Rooney PC

(57) ABSTRACT

Spherical polyamide particles having a mean particle size of less than 1 mm, notably less than 100 μm, are produced by dispersing the polyamide monomers in an inert liquid and then polymerizing same.

20 Claims, No Drawings

PRODUCTION OF SPHERICAL POLYAMIDE PARTICLES

CROSS-REFERENCE TO PRIORITY/PCT APPLICATIONS

This application claims priority under 35 U.S.C. § 119 of FR 03/07719, filed Jun. 26, 2003, and is the National Phase of PCT/FR 2004/001555, filed Jun. 22, 2004 and designating the United States, published on Jan. 6, 2005 as WO 2005/000456 A2, each hereby expressly incorporated by reference and each assigned to the assignee hereof.

The invention relates to a process for preparing of spherical particles based on polyamide with a mean diameter of less than 1 mm, preferably less than 100 µm. The process of the invention comprises more particularly a step for dispersing the monomers in an inert liquid, and a step for polymerizing the monomers.

Polyamide in powdered form, that is to say in the form of spherical particles with a diameter of generally less than 1 mm, preferably less than 100 µm, is of interest for numerous applications. Indeed, polyamide powders are used in particular as additive in paints, for example in paints for coating the floors of sports halls which thus exhibit antislip properties. Polyamide powders are also introduced into cosmetic products such as antisun, body or face care and makeup removing creams. They are also used in the ink and paper sectors.

Various processes for producing polyamide powders are known to persons skilled in the art.

Polyamide powders may be obtained, for example, by grinding or freeze-grinding of polyamide granules with an initial mean diameter of the order of 3 mm. Nevertheless, these mechanical conversions by size reduction often result in particles of irregular shape and having a size rarely less than 100 µm. The size distribution of these particles is often broad and they can hardly be used on an industrial scale.

It is also known to prepare polyamide powders by dissolving polyamide in a solvent, followed by reprecipitation. The solvents for polyamide being very corrosive and volatile, the safety conditions are strict and this process cannot be used on an industrial scale.

Other processes exist, according to which the polyamide powders are prepared in situ during the polymerization of the polyamide monomers.

For example, it is known to obtain polyamide powders by anionic polymerization of lactams in solution. The polymerization is performed in the presence of monomers, a solvent for the monomers, an initiator, a catalyst, an activator and the polymerization is carried out with stirring at a temperature in the region of 110° C. This process is specific for the polyamides obtained from monomers of the lactam type. It is not very flexible and does not make it possible to diversify the nature of the polyamide powders according to the desired final properties of the powder by varying the nature of the monomers, for example. It is also known to obtain copolyesteramide powders by anionic polymerization of lactams and lactones. These anionic polymerization processes are difficult to control because of the high reactivity of the anionic route in particular.

It is also known to prepare stable polyamide dispersions by emulsifying monomers in an inert medium in which at least one monomer and the polyamide formed are insoluble, with the aid of emulsifying agents. The use of emulsifying agents to prepare the dispersion may have a disadvantage if these agents are still present in the final powder, after separation of the powder from the medium. Furthermore, it is not easy to separate the emulsifying agents from the powder. Indeed, the emulsifying agents, for example block copolymers, may have some affinity for the polyamide. They may also be potentially reactive with the polyamide and may therefore be linked in the end to the polyamide.

The present invention provides a process for preparing spherical particles based on polyamide, which does not exhibit these disadvantages. It is a process for preparing spherical particles based on polyamide with a mean diameter of less than 1 mm, preferably less than 100 µm, comprising the following steps:

a) preparing a dispersion of a first liquid comprising polyamide monomers, in a second inert liquid b) polymerizing the monomers by polycondensation and/or polyaddition by heating the reaction medium and maintaining the heating at a temperature below the melting point of the polyamide with the desired degree of polymerization c) optionally decompressing the reaction medium to atmospheric pressure d) optionally gradually cooling the reaction medium e) recovering the spherical particles based on polyamide.

This process uses in particular mild temperatures, which makes it possible to avoid potential degradations of the polyamide, such as decarboxylation reactions or branching reactions.

This process also makes it possible to obtain spherical particles having a satisfactory size distribution.

The expression spherical particle is understood to mean a particle which is essentially spherical in shape.

The expression disperse is understood to mean, for example, emulsify or suspend.

The expression reaction medium, in the context of the invention, is understood to mean the medium contained in the reactor. It is generally the combined first liquid and second liquid. It is a two-phase medium comprising a continuous phase formed by the second liquid, and a dispersed phase formed by the first liquid.

The expression monomers is also understood to mean oligomers obtained by polymerization of the monomers.

The expression mean diameter is understood to mean the value on which the particle size distribution is centered.

The process of the invention is generally carried out in a reactor, for example in a reactor with a vertical cylindrical shape.

Step a) is generally carried out with stirring, for example with mechanical stirring. There may be mentioned, as an example of a stirrer which may be used in the context of the invention, a straight blade Rushton turbine. Certain parameters regarding the stirring can play a role for producing a stable dispersion and therefore for producing particles having the desired diameter. These parameters have been studied in particular in an article by Calabrese et al., "Drop Breakup in Turbulent Stirred-Tank Contactors", *AIChE Journal*, 32, 657 (April 1986). For example, the ratio between the diameter of the stirring module and the diameter of the reactor may be decisive. It is advantageously between 0.2 and 0.8, preferably equal to about 0.5. Another parameter is the product of the stirring speed by the duration of stirring, for the production of a stable dispersion. Preferably, this product is greater than 3800. The stirring speed and the duration of stirring may be variable. The stirring speed is adjusted in particular according to the desired particle diameter. The duration of stirring must be sufficiently long to mechanically stabilize the dispersion.

According to a particular embodiment of the process of the invention, an inert gas stream is introduced into the top of the reactor during step a) and/or b). The inert gas is advantageously chosen from nitrogen, rare gases, inert gases, air enriched with nitrogen, carbon dioxide, and mixtures thereof.

The polyamides of the invention are generally obtained from two different monomers, or from a single monomer. The invention applies, on the one hand, to the polyamides derived from two different monomers, the most important polyamide of which is poly(hexamethylene adipamide). Of course, these polyamides may be obtained from a mixture of diacids and diamines. Thus, in the case of poly(hexamethylene adipamide), the principal monomers are hexamethylenediamine and adipic acid. However, these monomers may comprise up to 25 mol % of other diamine or diacid monomers or even amino acid or lactam monomers. The invention applies, on the other hand, to the polyamides derived from a single monomer, the most important polyamide of which is polycaprolactam. Of course, these polyamides may be obtained from a mixture of lactams and/or amino acids. Thus, in the case of polycaprolactam, the principal monomer is caprolactam. However, these monomers may comprise up to 25 mol % of other amino acid or lactam monomers or even diamine or diacid monomers.

Polyamides of the "AABB" type, derived from two different monomers, are generally manufactured using, as raw material, a salt obtained by mixing, in a stoichiometric quantity, in general in a solvent such as water, a diacid with a diamine.

Thus, in the manufacture of poly(hexamethylene adipamide), the adipic acid is mixed with hexamethylenediamine, generally in water, in order to obtain a hexamethylenediamine adipate better known by the name of Nylon salt.

The solution of Nylon salt is optionally concentrated by partial or complete evaporation of the water.

The polyamides of the "AB" type, derived from a single monomer, are generally manufactured using, as raw material, a lactam and/or an amino acid, and a small quantity of water or another initiator, the proportion by weight of water is generally between 1 and 30%.

The expression acid is understood to mean carboxylic acids and their derivatives, such as acid anhydrides, acid chlorides, esters and the like. The expression amine is understood to mean amines and their derivatives.

The polyamide monomers of the invention may therefore be lactams, amino acids, diamines or diacids, Nylon salt, mixtures of these various compounds. These monomers may be linear, aromatic, aliphatic, cycloaliphatic or arylaliphatic compounds. Other monomers may also be added, such as polyfunctional compounds, that is to say having at least three acid or amine functional groups. There may be mentioned, by way of polyfunctional monomers, the compounds having three acid functional groups or three amine functional groups, and the compounds comprising two acid functional groups and one amine functional group, or two acid functional groups and one amine functional group.

The lactam or amino acid monomers may be chosen, for example, from caprolactam, 6-aminohexanoic acid; 5-aminopentanoic acid, 7-aminoheptanoic acid. The preferred lactam is caprolactam.

The dicarboxylic acid monomers may, for example, be chosen from glutaric acid, adipic acid, suberic acid, sebacic acid, dodecanedioic acid; 1,2- or 1,3-cyclo-hexanedicarboxylic acid; 1,2- or 1,3-phenylenediacetic acid; 1,2- or 1,3-cyclohexanediacetic acid; isophthalic acid; terephthalic acid; 4,4'-oxybis(benzoic acid); 4,4'-benzophenonedicarboxylic acid; 2,5-naphthalene dicarboxylic acid; and p-t-butylisophthalic acid. It may be adipic acid comprising by-products derived from the manufacture of adipic acid, for example a mixture of adipic acid, glutaric acid and succinic acid. The preferred dicarboxylic acid is adipic acid.

The diamine monomers may, for example, be chosen from hexamethylenediamine; 2-methylpentamethylenediamine; 2-methylhexamethylenediamine; 3-methylhexamethylenediamine; 2,5-dimethylhexamethylenediamine; 2,2-dimethylpentamethylenediamine; 5-methylnonanediamine; dodecamethylenediamine; 2,2,4- and 2,4,4-trimethylhexamethylenediamine; 2,2,7,7-tetramethyloctamethylenediamine; meta-xylylenediamine; para-xylylenediamine; diaminodicyclohexylmethane and $C_2$-$C_{16}$ aliphatic diamines which may be substituted with one or more alkyl groups.

The preferred diamine is hexamethylenediamine. The polyamide of the invention may also be a polymer comprising, in addition to monomers of the amino acid, lactam, carboxylic acid or amine type, other monomers of a different nature. By way of example of such monomers, there may be mentioned, for example, alcohols, such as diols, diisocyanates and the like. Glycol may be mentioned by way of example of an alcohol. The polyamide of the invention may, for example, be a copolyester amide.

The polyamide of the invention is obtained by polycondensation and/or polyaddition. When the polyamide is obtained by polycondensation, the linkages between the monomers which form the polymer involve atoms other than carbon atoms and a by-product of low molecular weight—generally water—is cogenerated during the polymerization reaction.

According to a particular embodiment of the process of the invention, the first liquid consists of polyamide monomers.

The first liquid of step a) may comprise molten monomers or a solution of monomers in a solvent.

When the first liquid comprises molten monomers, it may be obtained, for example, by melting of Nylon salt, or by melting of caprolactam, or by melting of a mixture of monomers. The first liquid may be obtained before its introduction into the reaction medium, or directly in the reaction medium. Thus, it is possible, for example, to introduce the monomers in solid form into the reaction medium, and then to melt the monomers in the reaction medium.

When the first liquid comprises a solution of monomers in a solvent, it may be obtained by dissolving the monomers in a solvent, such as water or glycol. For example, the first liquid may be a solution of Nylon salt in water.

When the first liquid comprises a solution of monomers in a solvent, the quantity of monomers is advantageously greater than or equal to 25% by weight in the first liquid.

The first liquid may contain, in addition to the polyamide monomers, additives such as pigments, for example titanium dioxide, inorganic or organic fillers in divided form. The elementary size of the additives is preferably less than the desired size of the spherical polyamide particles of the invention.

The first liquid may be obtained by any method known to persons skilled in the art.

The second liquid of the invention is inert.

The expression "inert" is understood to mean chemically inert, in particular in relation to the reaction for polymerization of the monomers.

The second liquid and the first liquid are essentially immiscible.

The expression "immiscible" is preferably understood to mean a solubility of the second liquid in the first liquid of less than 5% by weight. The maximum solubility is detected by gradually adding, with stirring, the second liquid to the first liquid until a phase separation of the two liquids is detected.

The second liquid preferably has a high boiling point. Preferably, the boiling point of the second liquid is greater than 150° C. at atmospheric pressure. The boiling point of the second liquid is preferably greater than the polymerization temperature of step b).

As second liquid suitable for carrying out the invention, hydrocarbon compounds may be mentioned. These compounds may be derived, for example, from a cut of aliphatic hydrocarbons having a number of carbon atoms of less than or equal to 20. The hydrocarbon cut may be a liquid product at atmospheric pressure at the polymerization temperature in a dispersed phase. The dispersed phase polymerization may also be advantageously carried out in a gaseous hydrocarbon cut at atmospheric pressure at a temperature greater than 150° C. and maintained in the liquid state under pressure during the dispersed phase polymerization.

Preferably, the second liquid is an aliphatic hydrocarbon or a mixture of aliphatic hydrocarbons. There may be mentioned, by way of example of a hydrocarbon which may be used in the context of the invention, dodecane, decane and the like. A cut marketed by the company Shell Chemicals under the reference Shellsol® D100 may, for example, be used.

According to a particular embodiment of the process of the invention, the reaction medium is free of dispersion-stabilizing agent or emulsifying agent known to persons skilled in the art. Preferably, the reaction medium is free of surfactant.

The second liquid may comprise monomers of the polyamide of the invention, for example the second liquid may comprise monomers in solid form dispersed in the second liquid, intended to form the continuous phase of the dispersion.

The second liquid may also comprise additives as described above for the first liquid.

The first liquid or a precursor of the first liquid—for example monomers in solid form—is introduced into the second liquid or conversely according to a method known to persons skilled in the art.

The temperature of the first liquid during this introduction is preferably between 50 and 150° C.

The temperature of the second liquid during this introduction is preferably identical, to within 20° C., to that of the first liquid.

The ratio between the volume of the first liquid and the volume of the second liquid used is preferably greater than or equal to 0.5, preferably greater than or equal to 0.75.

The temperature during step a) varies in particular according to the nature of the monomers, due to the fact that the first liquid consists of molten monomers or of a solution of monomers in a solvent, and the like. Advantageously, the temperature during step a) is constant during the entire duration of the step in order to ensure good stability of the dispersion. The temperature is chosen such that the reaction medium is maintained in the liquid state during step a). Preferably, the temperature during step a) is between 50 and 150° C.

The pressure during step a) is advantageously constant. It is preferably between 1 and 5 bar. It is chosen such that the reaction medium is maintained in the liquid state during step a). The pressure may be chosen in particular according to the concentration and the solubility of the monomers in the solvent when they are in solution in a solvent, and the vapor pressure of the molten monomers when they are not in solution in a solvent.

The temperature and the pressure during step b) are chosen in particular according to the composition of the first liquid, and such that the polymerization reaction between the monomers takes place. When the pressure is greater than atmospheric pressure, it is generally autogenous, and regulated, where appropriate, if it reaches a threshold value, for example equal to 15 bar. The temperature during step b) is less than the melting point of the polyamide with the desired degree of polymerization.

For example, when the first liquid is a solution of the monomers in a solvent for the monomers, and when the solvent is water, the pressure during step b) is generally greater than atmospheric pressure. Preferably, the pressure during step b) is between 1 and 20 bar.

The temperature during step b) is preferably greater than or equal to 150° C. The temperature may vary during the progress of the reaction, generally increasing, but should always remain less than the melting point of the polyamide with the desired degree of polymerization.

The final polyamide obtained generally has a mean degree of polymerization of between 2 and 200. Advantageously, the final polyamide is an oligomer with a mean degree of polymerization of between 10 and 30.

Step b) of polymerization may be carried out in the presence of a polymerization catalyst. The catalyst is generally introduced into the reaction medium with the monomers, preferably before preparing the dispersion of step a).

According to a particular embodiment of the process of the invention, corresponding in particular to the case where the first liquid is a solution of the monomers in a solvent for the monomers, an azeotrope of the second liquid, of the solvent for the monomers of the first liquid, and of the by-product of polycondensation is distilled during step b). This distillation makes it possible, in particular by removing the by-product of polycondensation, generally water, to promote the polycondensation reaction. The distillation is carried out according to a method known to persons skilled in the art.

Step b) is generally carried out with stirring—like step a)—, in order to maintain the dispersion prepared in step a) as it is. This stirring promotes in particular the degassing of the by-product of polycondensation.

Preferably, the duration of step b) is between 10 and 60 minutes. This duration varies in particular according to the desired degree of polymerization of the polyamide.

According to a particular embodiment of the process of the invention, corresponding in particular to the case where the pressure during step b) is greater than atmospheric pressure, the process comprises a step c) of decompression to atmospheric pressure, the temperature during step c) being less than the melting point of the polyamide with the desired degree of polymerization. The temperature during this step c) is preferably greater than 150° C. This decompression step is carried out according to a method known to persons skilled in the art. The decompression is preferably progressive in order to avoid the agglomeration of the spherical polyamide particles.

The process of the invention may also comprise a finishing step in order to obtain the desired degree of polymerization. The finishing may be performed at atmospheric or reduced pressure. The temperature during the finishing is moderate, and preferably between 150 and 220° C. The temperature during this finishing step is less than the melting point of the polyamide with the desired degree of polymerization.

According to a preferred embodiment of the process of the invention, the process comprises a step d) for gradual cooling of the reaction medium in order to avoid the agglomeration of the particles. It may be carried out, for example, by controlled additions of cold second liquid to the reaction medium. The temperature at the end of step d) is preferably less than or equal to 180° C. Step d) is preferably carried out with slow stirring in order to maintain thermal homogeneity.

According to a particular embodiment of the process of the invention, step c) for decompression and step d) for cooling are carried out simultaneously.

The process of the invention comprises a step e) for recovering the spherical polyamide particles. The temperature during step e) is preferably between 50 and 180° C.

Step e) is a step during which the product of the dispersed phase polymerization in a liquid medium is isolated from the dispersion medium. The isolation may be carried out by any means which makes it possible to separate a solid phase in suspension from a liquid phase. The isolation may consist, for example, of a filtration, a decantation or a centrifugation. If the dispersion medium is a liquid medium consisting of a gaseous compound at atmospheric pressure liquefied under pressure, the isolation may be carried out by expansion of the medium, by flashing for example.

The spherical polyamide particles recovered are preferably then washed according to step f) of the process of the invention. This washing step makes it possible in particular to remove possible traces of solvent initially contained in the first liquid, which traces may be problematic for certain applications of the final particles.

The particles are preferably then dried according to step g) of the process of the invention.

According to a particular embodiment of the process of the invention, the spherical particles obtained have a mean diameter of less than or equal to 100 μm.

Advantageously, the particles obtained according to the process of the invention have a mean diameter of less than or equal to 30 μm. Preferably, they have a mean diameter of less than or equal to 10 μm, more preferably still less than or equal to 5 μm. The particle size distribution is generally determined by laser particle size analysis according to a method known to persons skilled in the art.

According to a particular embodiment of the invention, steps a) to g) are successive.

Other details or advantages of the invention will appear more clearly in the light of the examples given below, which do not constitute a limitation to the invention.

EXAMPLES

Example 1

In a reactor R1, 240 g of dry Nylon salt are dissolved in 1 l of ethylene glycol at 100° C. under a nitrogen stream.

In parallel, 1 l of Shellsol D100®, marketed by the company Shell Chemicals, which is preheated to 100° C., under a nitrogen stream, is introduced into a reactor R2.

The solution from the reactor R1 is transferred into the reactor R2: the mixture is stirred with the aid of a Rushton turbine equipped with 4 straight counter-blades for 30 minutes at a speed of 800 rpm at 100° C. in order to prepare a liquid-liquid dispersion.

The reference temperature for heating the thermostatted bath supplying the reactor R2 is brought to 220° C. The temperature of the dispersion rises from 100° C. to 183° C. A Dean-Stark type condenser then makes it possible to condense the vapors derived from the reactor. The distillation under atmospheric pressure is stopped after 60 minutes. The reaction mixture from the reactor R2 is then cooled by progressively adding cold hydrocarbon with the aid of a dropping funnel. The temperature of the reaction mass is controlled by small additions of cold hydrocarbon to the reactor R2. This method of cooling makes it possible to avoid the coagulation of the droplets of polymer during their solidification.

When the temperature of the reaction mixture in the reactor R2 reaches a value of 160° C., the mixture is transferred to a reactor R3. The dense phase separates by decantation at the bottom of the reactor. This dense phase is mixed with 1 l of pure ethanol in a beaker, filtered, dried under vacuum under a nitrogen stream.

The fluid white powder obtained is composed of polymer particles having a spherical shape under a scanning electron microscope, a mean degree of polymerization in numerical terms equal to 13 and a median particle diameter, measured by laser particle size analysis, equal to 11 microns.

Example 2

In a reactor R1, 470 g of dry Nylon salt are dissolved in 0.5 l of water at 50° C. under a nitrogen stream. The solution comes to a temperature from 78° C. to 50° C. under a nitrogen stream: the exothermicity of the salification reaction allows the solution to come to a temperature of 78° C. In parallel, 1 l of Shellsol D100®, which is preheated to 80° C. under a nitrogen stream, is introduced into a reactor R4.

The solution from the reactor R1 is transferred into the reactor R4: the mixture is stirred with the aid of a Rushton turbine equipped with 4 straight counter-blades for 30 minutes at a speed of 800 rpm at 80° C. in order to prepare a liquid-liquid dispersion.

The reference temperature for the heating circuit of the reactor R4 is progressively brought from 120 to 155° C. so as to concentrate the Nylon salt at about 72%. When the temperature of the reaction mixture reaches 140° C., the reference temperature for the heating circuit of the reactor R4 is brought to 240° C. When the pressure reaches the value of 18.5 absolute bar, the reference temperature for the heating circuit of the reactor R4 is progressively brought to 260° C. The opening of the distillation valve of the reactor R4 makes it possible to regulate the pressure inside the autoclave.

When the temperature of the reaction mixture reaches the value of 250° C., the reference temperature for the heating circuit of the reactor R4 is progressively brought from 260° C. to 200° C. The pressure in the reactor is then progressively reduced to atmospheric pressure, in a controlled manner. At this stage, a sample shows that after cooling, washing and drying, the particles have a spherical morphology under a scanning electron microscope, a mean degree of polymerization in numerical terms equal to 45 and a median particle diameter, measured by laser particle size analysis, equal to 9 microns.

The mean degree of polymerization in numerical terms of the particles is then increased by solid phase polycondensation in the hydrocarbon where the temperature is regulated at 190° C. for 1 h 30 min. The contents of the reactor R4 are then poured into the reactor R3.

The temperature reaches 125° C. in the reactor R3, the dense phase separating by decantation at the bottom of the reactor. This dense phase is mixed with 1.5 l of ethanol in a beaker, filtered, dried under vacuum under a nitrogen stream.

The white fluid powder obtained is composed of polymer particles having a spherical shape under a scanning electron microscope, residual reaction groups consisting of amine groups 72 meq/kg and carboxyl groups 107 meq/kg, and a median particle diameter, measured by laser particle size analysis, equal to 10 microns.

This method thus allows the manufacture of Polyamide 6,6 powder with controlled morphology and mean degree of polymerization in numerical terms (therefore with residual functionality) under process conditions, in particular of temperature, which are relatively mild compared with the usual conditions for polycondensation of Polyamide 6,6 in a molten medium.

The invention claimed is:

1. A process for preparing spherical polyamide particles having a mean diameter of less than 1mm, comprising the following steps:
   a) preparing a dispersion of a first liquid which comprises a solution of polyamide monomers in a solvent, in a second inert liquid thereby forming a reaction medium, the reaction medium comprising two phases, a continuous phase formed by the second liquid, and a dispersed phase formed by the first liquid, the first and second liquids are essentially immiscible, wherein the ratio between the volume of the first liquid and the volume of the second liquid is greater than or equal to 0.5;
   b) polymerizing the monomers by polycondensation and/or polyaddition by heating the reaction medium and maintaining the heating at a temperature below the melting point of the polyamide with the desired degree of polymerization;
   c) optionally, decompressing the reaction medium to atmospheric pressure;
   d) optionally, gradually cooling the reaction medium; and
   e) recovering the spherical polyamide particles therefrom.

2. The process as defined by claim 1, said first liquid comprising a solution of monomers in water.

3. The process as defined by claim 1, said monomers comprising caprolactam, adipic acid or hexamethylenediamine.

4. The process as defined by claim 1, said second liquid having a boiling point greater than 150° C. at atmospheric pressure.

5. The process as defined by claim 1, said second liquid comprising an aliphatic hydrocarbon or a mixture of aliphatic hydrocarbons.

6. The process as defined by claim 1, wherein the pressure during step b) ranges from 1 to 20 bar.

7. The process as defined by claim 1, wherein the temperature during step b) is greater than or equal to 150° C.

8. The process as defined by claim 1, wherein an azeotrope of the second liquid, of the solvent for the monomers of the first liquid and of the by-product of polycondensation is distilled during step b).

9. The process as defined by claim 1, wherein the duration of step b) ranges from 10 to 60 minutes.

10. The process as defined by claim 1, wherein the temperature during step c) is less than the melting point of the polyamide with the desired degree of polymerization.

11. The process as defined by claim 1, comprising a step f) for washing the spherical polyamide particles.

12. The process as defined by claim 1, comprising a step g) for drying the spherical polyamide particles.

13. The process as defined by claim 12, wherein the steps a) to g) are successive.

14. The process as defined by claim 1, wherein the spherical particles have a mean diameter of less than 100 µm.

15. The process as defined by claim 14, wherein the spherical particles have a mean diameter of less than or equal to 30 µm.

16. The process as defined by claim 1, said ratio being greater than or equal to 0.75.

17. The process as defined by claim 15, wherein the spherical particles have a mean diameter of less than or equal to 10 µm.

18. The process as defined by claim 15, wherein the spherical particles have a mean diameter of less than or equal to 5 µm.

19. The spherical particles of the process as defined by claim 1.

20. The process of claim 1, wherein the reaction medium is free of a dispersion-stabilizing agent or an emulsifying agent.

* * * * *